(12) United States Patent
Nilsson

(10) Patent No.: US 7,104,155 B2
(45) Date of Patent: Sep. 12, 2006

(54) AUTOMATIC BRAKE SYSTEM MODULATOR

(76) Inventor: Bud Nilsson, P.O. Box 99101, Stockton, CA (US) 95209

( * ) Notice: Subject to any disclaimer, the term of this patent is extended or adjusted under 35 U.S.C. 154(b) by 301 days.

(21) Appl. No.: 10/669,233

(22) Filed: Sep. 22, 2003

(65) Prior Publication Data

US 2004/0079186 A1    Apr. 29, 2004

Related U.S. Application Data

(60) Provisional application No. 60/421,437, filed on Oct. 25, 2002.

(51) Int. Cl.
*B62L 3/08* (2006.01)
(52) U.S. Cl. .................................... 74/502.2
(58) Field of Classification Search ............... 74/502.2, 74/500.5, 502.5; 188/24.11, 24.15, 24.16
See application file for complete search history.

(56) References Cited

U.S. PATENT DOCUMENTS

| | | | |
|---|---|---|---|
| 3,942,609 A | 3/1976 | Hill | |
| 4,057,127 A | * 11/1977 | Woodring | 188/24.16 |
| 4,480,720 A | 11/1984 | Shimano | |
| 4,773,509 A | * 9/1988 | Sato | 188/24.16 |
| 4,895,224 A | * 1/1990 | Sugihara | 188/24.14 |
| 5,845,539 A | 12/1998 | Huang | |

* cited by examiner

Primary Examiner—Vicky A. Johnson

(57) ABSTRACT

A device for a two wheeled vehicle with two independent cable operated brake systems consisting of two pivoting levers connecting the two cables operating the brake calipers via cables enclosed in casings from the hand lever to the calipers, one operating the front brake and one operating the rear brake. That will regardless of which or both hand levers are applied first, the rear brake will be actuated before and with more force that to the front brake through the offset pivot point of the two levers, the fulcrum action will alter the length of the casing relative to the cable length of one brake and by tension transfer the differences of casing length to cable length on the opposite side and apply the brakes rear first with more force than front brake.

1 Claim, 1 Drawing Sheet

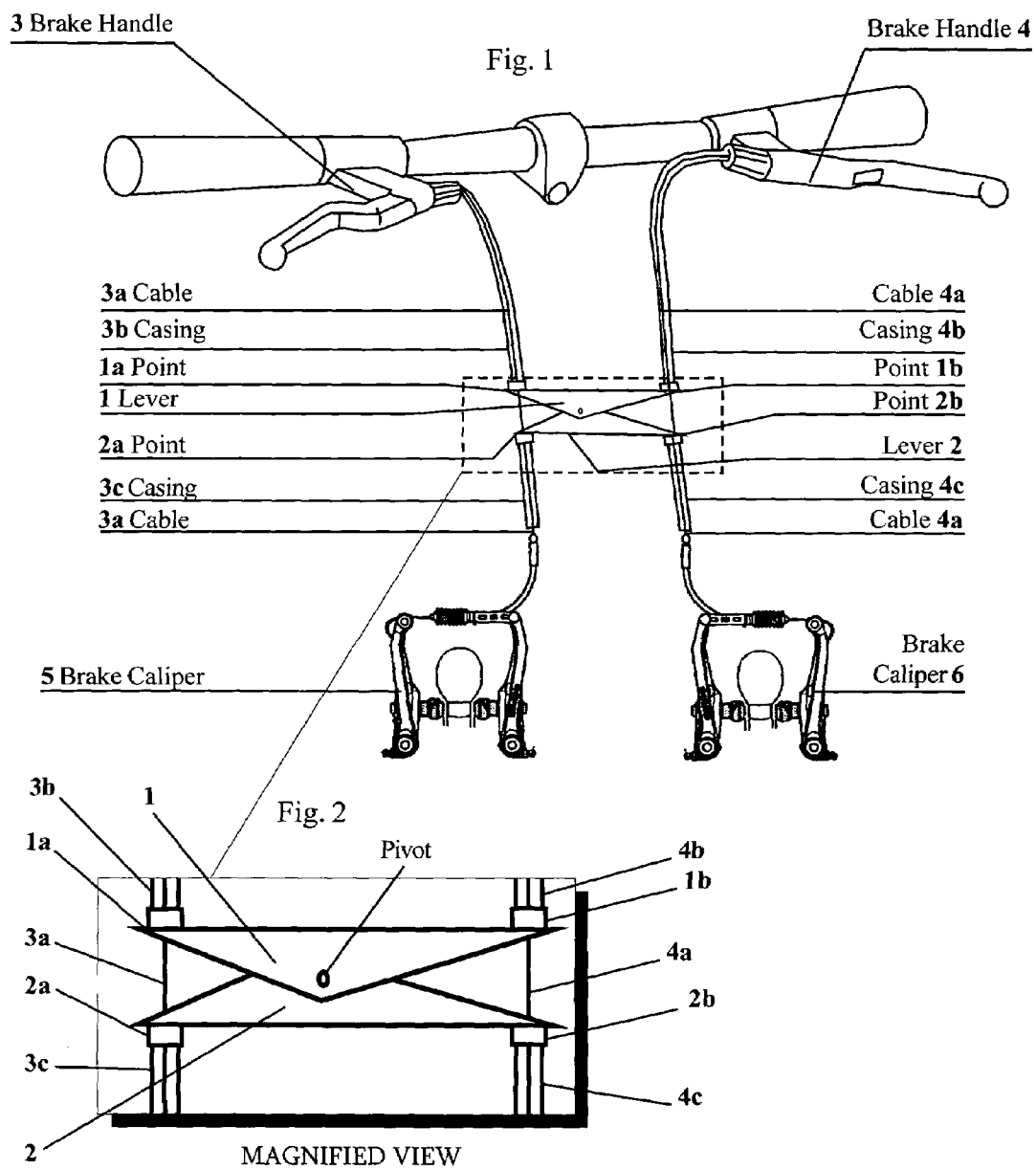

AUTOMATIC BRAKE SYSTEM MODULATOR

CROSS REFERENCE TO RELATED APPLICATIONS

This application claims the benefit of provisional Patent Application Ser. No. 60/421,437 filed 2002 Oct. 25

BACKGROUND OF THE INVENTION

This invention relates to two wheel vehicles braking systems, such as a bicycle or motorcycle equipped with two independent operated brakes, one for the front wheel and one for the rear wheel.

Operation of like brake systems such as applying the front brake only with too much pressure can lock up the front wheel and cause forward rollover accident.

This invention is a universal adapter that automatically will time and balance the braking action of each wheel regardless of which brake is activated, front or rear. This timed and balanced transfer of braking force to the rear and front wheels will provide more braking traction and prevent front wheel lock up reducing the risk of a forward rollover accident.

This fail-safe adapter is universal and adaptable to any dual cable operated brake system without modification to the vehicle.

BRIEF SUMMARY OF THE INVENTION

The main objective of this invention is to prevent front wheel lockup causing forward rollover reducing the risk of an accident.

Another objective of this invention is to automatically balance the braking force to the wheels to improve wheel traction during braking.

DETAILED DESCRIPTION OF INVENTION

The adapter consists of two levers made from rigid materials. Lever 1 and lever 2 are connected together at the fulcrum point. Existing components and parts of the vehicles brake system is incorporated and marked accordingly.

The control cables from the two brake handles, front and rear, go through the adapter levers holes at point's 1a, 2a, and 1b, 2b, to the brake caliper operators 5 & 6. The cable casings ends of 3b, 3c and 4b, 4c butts up to the receiving ferrules at lever point 1a, 2a, and 1b, 2b.

When the brake handle 3 pulls the cable 3a to activate the caliper 5, the caliper starts the braking action to the wheel rim or disc. The tension will increase in cable 3a as the cable pressure against the braking surface increases making casings 3b, 3c shorter relative to the length of the cable relative to cable 4a and activate caliper 6.

When the cable length relative to the casing length is adjusted so there is no gap or travel between the levers two points, 1a and 2a and brake handle 3 is actuated, the brake caliper 5 only is applied. If brake handle 4 is actuated, the distance between lever points 1b and 2b will decrease through tension in casing 4b and 4c.

The distance between lever points 1b and 2b is transferred through the joint levers 1 and 2 to the lever points 1a and 2a and the leverage will increase the distance between lever points 1a and 2a and make the casing 3b and 3c longer relative to cable 3a which will apply brake caliper 5.

The offset fulcrum point of levers 1 and 2 will modulate the tension in casings 4b, 4c and cable 4a to casings 3b, 3c and will apply caliper 5 first and with more friction than caliper 6.

When brake handle 4 is actuated the force of caliper 5 exceeds that of caliper 6. Assuming brake handle 4 is operating the front wheel, caliper 6, the fulcrum joint levers 1 and 2 will deliver tension to caliper 5 rear brake that exceeds that of caliper 6 front brake and apply more friction of caliper 5 rear that exceeds that of caliper 6 friction to front wheel. This prevents lockup of caliper 6 and with balanced force to caliper 5 will increase wheel traction during braking action.

What I claim my invention is:

1. A mechanism, for modulating the braking action between at least two brake systems comprising, two levers each having a ferruled hole near each end and hinged together at an intermediate point between said ferruled holes that couple at least two brake cables with casings at a location with a continuous connection between brake handles and brake calipers, said casings having ends butted up to said lever's ferruled holes with each inner cable continuing through ferruled holes, wherein by responding to the tension produced by said brake handles to said cables and said casings, the articulated reaction by said two levers increasing or decreasing the length between said casings relative to said inner cables, balancing the activation of said brake calipers regardless of which brake handle is applied, whereby this novel mechanism automatically modulates the braking sequence to the brake calipers.

* * * * *